Patented Oct. 12, 1943

2,331,865

UNITED STATES PATENT OFFICE 2,331,865

METHOD OF PREPARING COLD-WATER-SOLUBLE POWDERED CELLULOSE ETHERS

Richard W. Swinehart and Albert T. Maasberg, Midland, Mich., assignors to The Dow Chemical Company, Midland, Mich., a corporation of Michigan No Drawing. Application March 20, 1942, Serial No. 435,558

4 Claims. (Cl. 260—232)

This invention relates to a method of preparing an improved form of cellulose ethers which are insoluble in hot water and soluble in cold water and particularly to a method for preparing the same in a dry form which dissolves readily in cold water.

Although many cellulose ethers such as methyl cellulose, ethyl cellulose, etc., which are insoluble in hot water, are ordinarily described as being soluble in cold water, it is well known that it is necessary to treat these ethers, which have heretofore been available only in fibrous form, with hot water for from 20 to 30 minutes before they can be satisfactorily dispersed or dissolved in cold water. Such difficultly soluble fibrous cellulose ethers are herein referred to as cold-water-soluble cellulose ethers. The indirect procedure just referred to for preparing cold-water solutions of the cold-water-soluble cellulose ethers is obviously time-consuming, expensive, and otherwise disadvantageous in many manufacturing operations wherein aqueous compositions comprising these ethers are made. Thus, it is frequently necessary to prepare the solution of the cellulose ether separately from the solution or suspension of the other ingredients and to then mix the two to form the final composition. The necessity of following such a procedure also obviously precludes, in a great many instances, the possibility of preparing mixtures of the dry cold-water-soluble cellulose ethers with other dry materials, such as water-soluble dyes and pigments, and of then preparing thickened aqueous solutions or suspensions therefrom, especially since many of the substances which it is desirable to mix with the dry ether are affected adversely by contact with hot water.

Various procedures have been tried without success in attempting to prepare the cellulose ethers in a form easily dissolved in cold water. Thus, it has been proposed to "grind", shred or otherwise subdivide the ethers to increase the rate of dissolving. However, the fibrous forms of the cellulose ethers are difficult to grind or shred, and the finely divided material is little, if any, more easily dissolved in cold water than the unground material. The fibrous cellulose ethers, regardless of their state of subdivision, are not easily wetted by cold water, float on the surface when added to cold water, and tend to form into soft lumps, balls or nodules, which it is practically impossible to disperse in cold water. It has also been proposed to dry aqueous solutions of the cellulose ethers and to then grind the dried product. However, the resultant ground material dissolves only extremely slowly in cold water and the method is incapable of practical industrial application.

It is, therefore, an object of the present invention to provide a method of preparing cold-water-soluble cellulose ethers in a form more easily dissolved in cold water than are the fibrous forms heretofore available.

An additional object is to provide a method of preparing the aforesaid cellulose ethers in a dry, powdered form compatible with other dry materials, such as powdered dyes, pigments, adhesives, etc., to form dry compositions which may be brought into solution or suspension in cold water by simple mixing, whereby the cellulose ether performs its usual and characteristic functions in the solution or suspension.

An additional object is to provide a method of preparing the aforesaid cellulose ethers as dry, free-flowing, non-caking powders with an apparent density greater than that of the fibrous forms heretofore available, thus greatly facilitating storage, handling and shipping.

An additional object is to provide a method whereby cold-water-soluble cellulose ethers may be converted to a form easily dissolved in cold water.

The foregoing and related objects are readily accomplished by forming a mixture comprising a fibrous cold-water-soluble cellulose ether and from 2 to 88 per cent by weight of water, colloiding the mixture by subjecting it to mechanical pressure at a temperature below 50° C. until gel formation has partially occurred, i. e., until a translucent mass without visible fibrous structure is obtained, drying the partially gelled composition and grinding the dried product.

The undried colloided mixture may, depending upon the conditions under which colloiding is carried out, vary in consistency from a solid, friable gel to a translucent, jelly-like mass or, in case the treatment is carried too far, to a transparent gel or even to a liquid sol.

Although any cold-water-soluble cellulose ether may be converted by the method of the present invention to a form easily dissolved in cold water without a preliminary hot water treatment, the description of the invention will, for the sake of simplicity, be limited to its application to the preparation of methyl cellulose in such form.

The wet, fibrous methyl cellulose may result from a manufacturing operation, e. g., from an operation wherein methyl cellulose is prepared in known manner and washed with hot water to free it from water-soluble impurities, or it may be prepared in any convenient manner, such as by steaming substantially dry methyl cellulose or by exposing the methyl cellulose to a highly humid atmosphere or by making a uniform slurry of from 1 to 5 per cent by weight of methyl cellulose in hot water and subsequently removing the excess water, e. g., by pressing or by filtering under vacuum or by otherwise drying until only the desired proportion of water is retained in the methyl cellulose. Although the methyl cellulose may be treated with hot water in the above or equivalent manner at any temperature above about 50° C., the treatment is preferably carried out at above 70° C., since by so doing, a more uniform distribution of the water throughout the mass of the methyl cellulose appears to be obtained. The treatment with hot water may be carried out under super-atmospheric pressure if desired. Although the optimum water content of the water-wet methyl cellulose depends to some extent upon the properties of the particular methyl cellulose employed and upon the colloiding procedure to which it is to be subjected, a methyl cellulose-water mixture comprising from 2 to 88 per cent by weight of water is employed. The use of too large a proportion of water may allow gel formation to proceed so rapidly that it is difficult to subsequently dry the partially gelled product before colloiding has progressed to an undesired degree.

The water-wet fibrous methyl cellulose is cooled to a temperature below 50° C. and preferably to from 40° to 5° C. Although cooling may be carried out in any convenient manner, it has been found that, when the excess of water is removed by vacuum filtration, the temperature at which the slurry of the fibrous methyl cellulose is fed to the filter, and the degree of vacuum may be adjusted so that the temperature usually falls to below 50° C. by the time the water content of the mat of fibers on the filter has fallen to below 88 per cent. If it is desired to store the wet methyl cellulose prior to the pressure treatment, the water content may be reduced to a proportion at which appreciable colloiding is not apparent during storage, e. g., to below about 10 to 30 per cent, depending upon the intrinsic viscosity of the methyl cellulose. It is, of course, well known that methyl cellulose of higher water content readily forms a gel upon standing at temperatures below about 50° C. Alternatively, the cooling to below 50° C. may be carried out during the colloiding step, as will be apparent from the following description.

The mechanical colloiding may be carried out in any one of a number of ways, e. g., by plasticating in an extrusion machine, by malaxing on differential speed rolls or by direct pressure between equal speed rolls, or in a press. In the case of methyl cellulose of relatively high water content, e. g., a water content of from 55 to 88 per cent by weight, colloiding is, however, preferably carried out in an extrusion press wherein the wet methyl cellulose is colloided and extruded in a form satisfactory for the subsequent drying operation, e. g., in the form of rods, tubes, tapes, sheets, etc. The pressure under which the extrusion is carried out may vary over wide limits, e. g., from slightly above atmospheric pressure to several hundred pounds per square inch or higher. Lower pressures may be used when the wet methyl cellulose has been cooled to temperatures considerably below 50° C., i. e., to temperatures in the range 5° to 40° C., than when it has been cooled to only slightly below 50° C. The pressure and the time during which the pressure is maintained are usually varied inversely with the water content of the fibrous methyl cellulose. The pressure should be maintained for a period sufficiently long, e. g., for at least a few seconds, to allow the methyl cellulose to attain the desired degree of gel formation. If desired, a part of the cooling may be effected while the methyl cellulose is being extruded, e. g., by circulating a cooling fluid through the jacket of the extrusion machine. In the case of methyl cellulose of relatively low water content, e. g., a water content of from 2 to 55 per cent by weight, higher pressures are desirable and rolls or presses operating under high pressures, e. g., up to several tons per square inch, may conveniently be used. When rolls are used, the time during which the pressure is applied is, of course, relatively short and this, in turn, necessitates an additional increase in pressure.

The degree of colloiding may be judged visually. The mass, before it has been submitted to the mechanical pressure treatment, has the appearance of a fairly compact mat of white fibers. When the colloiding conditions are adjusted to produce the desired degree of gel formation, little, if any, fibrous structure can be observed, although the mass is translucent. Continued colloiding beyond this point is undesirable, because it converts the mass to a practically transparent gel which is nearly useless for making the product of the present invention. However, if air is entrapped in the product, as, for example, during extrusion, the gel will have a cloudy, milk appearance, even though colloiding has proceeded beyond the desired point.

Reference is made to a concurrently filed, copending application, Serial No. 435,557, wherein the preparation, at atmospheric pressures, of cold-water-soluble cellulose ethers in a form easily dissolved in cold water is described.

After colloiding has proceeded to the desired degree, the mass may be dried in any convenient manner, such as by placing it on trays and blowing hot air over it. Colloided methyl cellulose containing relatively small amounts of water, e. g., from 2 to 15 per cent of water, is not usually dried further, although it may be dried, if desired. Drying is carried out as rapidly as convenient and at any desired temperature below about 160° C. The temperature is preferably raised rapidly to 45° to 55° C. to prevent further colloiding which may take place if the mass is allowed to remain at lower temperatures. It has been observed that at higher drying temperatures the methyl cellulose tends to darken in color and its properties are somewhat changed. Considerable shrinkage of the material occurs during the drying step, although not nearly as much as when the colloiding is allowed to proceed until the mass is practically transparent. It is thought that by arresting the colloiding, as previously described, while the mass is still translucent, a gel of sufficient structural strength is obtained to prevent complete collapse of the gel structure when it is dried and that a relatively porous product is thus obtained. It has been noted that when colloiding is continued until a practically transparent gel is obtained and the gel then dried, a horny product is obtained which does not possess the desirable solubility characteristics of the product of the present invention. The dried product may contain less than 15 per cent, preferably less than 10 per cent, of moisture. The dried material, which is friable and easily pulverized, is ground in any of the usual types of pulverizers and is then ready for use. Although the fineness to which the product is ground is optional, it has been found that a product of 60 to 100 mesh fineness, or finer, is a free-flowing, non-caking powder which dissolves readily when simply stirred with cold water. The individual particles are easily wetted by cold water and sink immediately upon being added to water. 100 cubic centimeters of the powdered methyl cellulose usually weighs between 35 and 45 grams, as compared with the usual weight of from 10 to 15 grams for 100 cubic centimeters of the ordinary fibrous methyl cellulose.

Although, as hereinbefore mentioned, the process of the present invention is applicable to the manufacture of a powder easily dissolved in cold water from any cold-water-soluble cellulose ether, such as can be made, for example, by alkylating an alkali cellulose, the process has particular utility when applied to the powdering of the commercially available methyl cellulose of from 23 to 33 per cent methoxyl content. Such methyl cellulose is frequently prepared by methylating an alkali cellulose and isolating the methylated product from the reaction mixture in the form of a fibrous mass which is then washed with hot water. The washed fibrous mass may conveniently serve as a starting material of the present invention.

It may be mentioned that the process herein described may easily be adapted to continuous operation, since the steps involved are of a type lending themselves particularly to this mode of operation. A uniform product may thus be produced in volume and at low cost.

In a particular example, one part by weight of fibrous methyl cellulose which had a methoxyl content of 30.5 per cent and which, when dissolved by the usual method involving a preliminary treatment with hot water, formed a 2 per cent by weight solution in water having a viscosity of 4000 centipoises at 20° C., was stirred with 67 parts of water at 90° C. until a uniform slurry was obtained. While still hot, the slurry was filtered on a rotary vacuum filter. The rate of feed of the slurry to the filter, the degree of vacuum, and the speed of rotation of the filter were adjusted until the fibrous mat leaving the filter had a water content of 65 per cent by weight and a temperature of 45° C. The material was then placed in an extrusion machine operating at a pressure of 500 to 600 pounds per square inch, and extruded in the form of soft, translucent rods approximately 0.125 inch in cross sectional diameter. The extruded material was collected on trays and placed in a drying cabinet, where it was dried by means of a stream of air heated to about 80° C. Drying was continued until the moisture content of the methyl cellulose had been reduced to 5 per cent by weight. The dried material was then removed from the trays and ground. The methyl cellulose so obtained was in the form of a free-flowing, non-caking powder, which weighed 44 grams per 100 cubic centimeters, which sank immediately when thrown into cold water, and which dissolved rapidly on being stirred with cold water.

In a second example methyl cellulose containing about 4 per cent by weight of water was rolled at ordinary room temperatures between opposing steel rollers operating under a pressure of several tons per square inch. The rolled methyl cellulose was ground in a conventional pulverizer. The ground product was found to dissolve easily in cold water and was substantially identical in properties, except for a slightly higher apparent density, with the product prepared, as described above, by drying and grinding the extruded wet methyl cellulose.

Mixtures of the powdered methyl cellulose with powdered water-soluble dyes and with powdered pigments were prepared. These mixtures were stable during storage and when stirred with cold water formed thickened stable solutions and suspensions, respectively, similar in every respect to solutions and suspensions prepared in the best accepted manner using ordinary fibrous methyl cellulose. A 2 per cent solution prepared by stirring 2 grams of the methyl cellulose with 98 grams of water at 25° C. had a viscosity of 3500 centipoises at 20° C.

We claim:

1. In a method of preparing a cold-water-soluble cellulose ether which is readily wettable by and soluble in water, the step which consists in subjecting at a temperature below 50° C. a mixture of water and a fibrous cold-water-soluble cellulose ether, containing from 2 to 88 per cent of water by weight, to mechanical pressure of such magnitude and for such time that the original fibrous structure of the mass is caused substantially to disappear and the latter is transformed into a translucent gel.

2. In a method of preparing a cold-water-soluble cellulose ether which is readily wettable by and soluble in water, the steps which consist in preparing at a temperature above 50° C. a mixture of water and a fibrous cold-water-soluble methyl cellulose containing from 2 to 88 per cent of water by weight, cooling the mixture to a temperature below 50° C. and subjecting the cooled mixture to mechanical pressure of such magnitude and for such time that the original fibrous structure of the mass is caused substantially to disappear and the latter is transformed into a translucent gel.

3. Method according to claim 2, in which the cooling and pressure treatment of the water-wet fibrous mass are carried out simultaneously.

4. Method according to claim 2, in which the gel product is air-dried at a temperature between 45° and 160° C. to a moisture content below 15 per cent, and the dried material is ground to a fine powder.

RICHARD W. SWINEHART.
ALBERT T. MAASBERG.